*INVENTOR*
Harold A. Willett

Dec. 3, 1968   H. A. WILLETT   3,414,285
CANE HARVESTER AND METHOD OF HARVESTING CANE
Filed Aug. 22, 1966   2 Sheets-Sheet 2

INVENTOR
Harold A. Willett

BY Wilkinson, Mawhinney & Theibault
ATTORNEYS

United States Patent Office 3,414,285
Patented Dec. 3, 1968

3,414,285
CANE HARVESTER AND METHOD OF
HARVESTING CANE
Harold A. Willett, Thibodaux, La., assignor to Cane
Machinery & Engineering Company, Inc., Thibodaux,
La., a corporation of Louisiana
Filed Aug. 22, 1966, Ser. No. 574,095
4 Claims. (Cl. 280—43.23)

ABSTRACT OF THE DISCLOSURE

According to the disclosure, one front wheel of a cane harvester is capable of lifting and lowering movements from and into supporting contact with the ground without in any way affecting the permanent support of the harvester by the two rear wheels and the companion steerable front wheel for the purpose of effecting short sharp turns of the vehicle in entering, leaving and re-entering the square of growing cane whereby a novel construction of harvester results also in a novel method of operating the harvester in a cane field with appreciable saving of time in gathering the crop which is an important consideration in Louisiana in the beating the arrival of the first killing frost.

---

The present invention relates to cane harvester and method of harvesting cane, and particularly to a four-wheel Thomson-type harvester in which a front wheel is mounted to the frame of the harvester for lifting and lowering movements whereby when the machine is in the cane field performing a cutting operation this fourth wheel will supply to the harvester added flotation of four wheels. However, when the harvester arrives at the end of the row and is required to make a turn in the headland to return to the square, such fourth wheel may be controllably lifted from the ground giving the advantage of three-wheel turning.

Another object of the invention is to provide the harvester with lifting and lowering mechanism for one of the front wheels to enable the other steerable front wheel to singly support and steer the harvester in the headland for sharp turning purposes to conserve time in re-entering the square and to facilitate and shorten movements of the harvester incident to the cutting of cane.

The mechanism of the invention is developed to such a degree that the harvester can execute a complete turn of 180° substantially in its own length.

A further object of the invention is to so equip a cane harvester that it will possess the foregoing advantages by simple mechanical means readily accessible to the driver for lifting and lowering the front fourth wheel while the companion front wheel remains on the ground to sustain the load during periods of turning and is itself connected to steering mechanism by which sharp turning of the harvester is made possible.

A still further object of the invention is to arrange the controls for the front wheel accessible to the driver for quick and convenient operation.

A still further object of the invention is to provide a novel method of harvesting cane by use of the improved cane harvester whereby entry and re-entry of the harvester into the cane field is greatly facilitated with reduced linear movement of the harvester and consequent reduction of the time element in operating a cane harvester and consequent greater sucrose yield within such time element.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
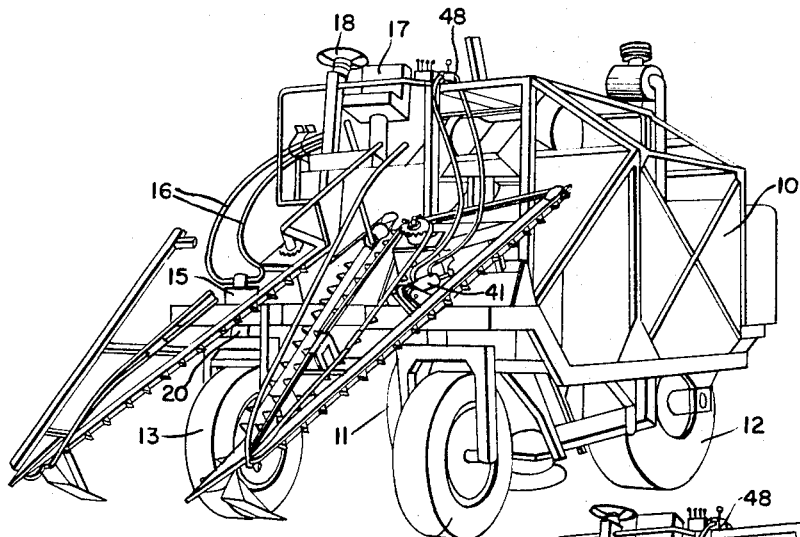
FIGURE 1 is a perspective view of a four-wheel cane harvester having all four wheels on the ground for adequate support of the harvester during movement up and down the rows in the act of cutting and performing other operations upon the cane.
Figure 2:
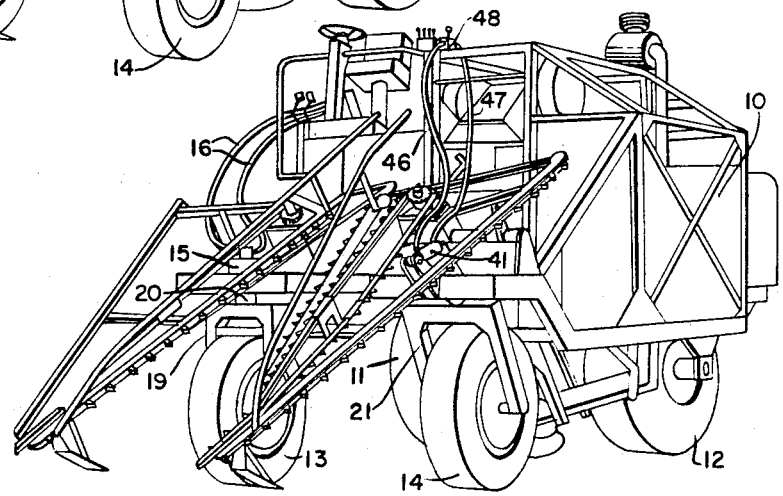
FIGURE 2 is a similar view showing one of the front wheels elevated above the ground while the other front wheel, a steerable wheel, remains on the ground and besides adequately supporting forward weight during turning, directs the turn and the angle thereof under the direction of the driver of the machine.

Referring more particularly to the drawings and in the first instance to FIGURES 1 and 2, a Thomson-type harvester is indicated generally at 10 being supported as to major weight by large heavy drive wheels 11 and 12. These wheels 11 and 12 are at a rear or centrally rear portion of the harvester in the area of greatest weight thereof and are connected to drive mechanism by which the harvester is propelled to and from the field, up and down the squares and through turning movements in the headlands.

The harvester is also partially supported by front wheels 13 and 14 of which at least the wheel 13 is a steering wheel shown in FIGURES 1 and 2 have steering mechanism designated generally at 15 which may be a hydraulic mechanism connected by hydraulic lines 16 to a location adjacent the driver's seat 17 or the steering wheel 18.

Such front wheel 13 is carried in a fork or wheel mount 19 swivelly mounted on an upright stud shaft 20 rotatable about a vertical axis in the frame 10 of the harvester. This supporting and steering wheel 13 and its steering mechanism may be of a conventional variety.

Figure 7:
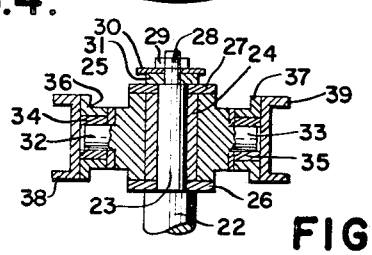
FIGURE 7 is a vertical sectional view taken on the line 7—7 in FIGURE 4.

Its companion front wheel 14 is also mounted in a fork or wheel mount 21, which fork is more particularly shown in FIGURES 3 to 7 inclusive. A stud shaft 22 rises from a central portion of the fork directly over the wheel 14 and, as shown in FIGURE 7, is rotatable about a vertical axis provided by a reduced upwardly extending spindle 23 mounted in a suitable bearing sleeve 24 fitted in a bearing block 25. Washers 26 and 27 abut the lower and upper ends of the bearing cylinder 24 and are abutted against upper and lower parts of the block 25. A further reduced upper end 28 of the spindle 23 is threaded to receive a nut 29 abutting a washer 30 clamped down upon a spacer 31.

The arrangement is such that the fork 21 and the wheel 14 may freely swivel about the vertical axis supplied by the spindle 23 in following steering movements of the companion steering wheel 13. It is preferred that no steering movements be applied to the fourth wheel 14 but this wheel 14 is free to swivel about its vertical axis in following steering movements of the wheel 13. However, it would not change the nature of the invention if the wheel 14 was linked with the wheel 13 for simultaneous steering movements.

Figure 4:
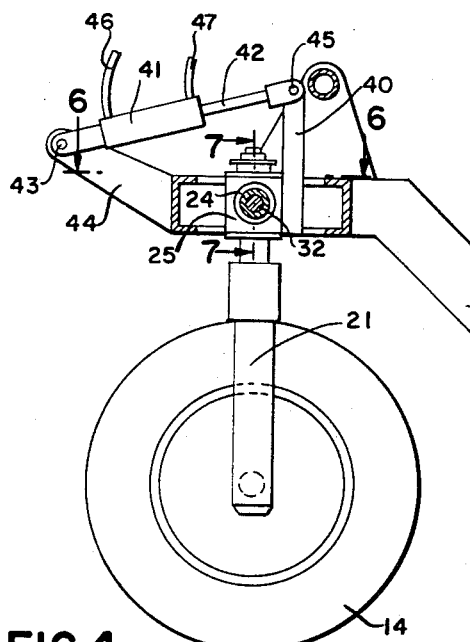
FIGURE 4 is a similar view of the wheel and its mounting, parts being broken away and parts shown in section with the wheel in the down position.
Figure 5:
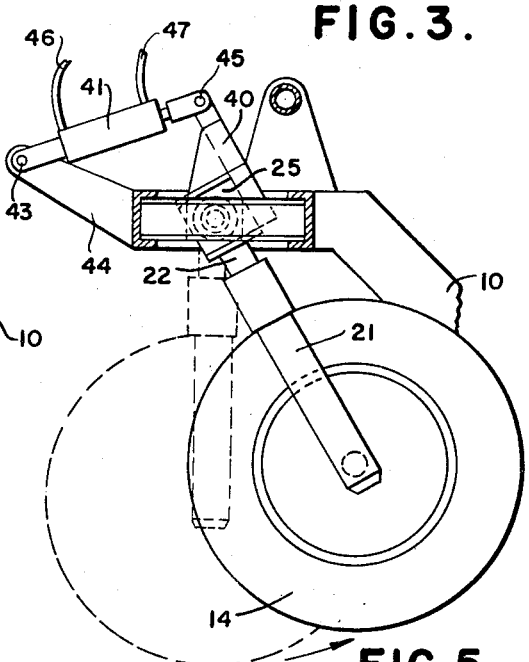
FIGURE 5 is a similar view showing the wheel in its elevated position.

As shown in the comparative views, FIGURES 4 and 5, the fork 21 is also capable of angular or swinging movement about a transverse substantially horizontal axis supplied by trunnions 32 and 33 extending in alignment from opposite ends of the block 25, as shown more particularly in FIGURE 7; these trunnions being housed in bearings 34 and 35 carried in cross members 36 and 37. The members 36 and 37 are carried by structural parts 38 and 39 mounted to the frame of the harvester in any suitable manner.

As shown more particularly in FIGURES 4 and 5, an upright member 40 is affixed at its lower portion to a side of the block 25 so that it rotates about the horizontal transverse axis 32, 33 in moving back and forth between the positions of FIGURES 4 and 5, FIGURE 4 showing the wheel 14 in normal position as a supporting front wheel in contact with the ground: while FIGURE 5 shows the elevated or raised position of the wheel 14, to which position the wheel is shifted when turns are to be executed at the ends of the rows.

Any suitable mechanism may be employed to rotate the block 25 and a hydraulic ram is illustrated in the drawings comprising a cylinder 41 and plunger rod 42, the cylinder being pivoted at 43 to a horn or arm 44 extending out from a part of the framework while the plunger rod is pivoted at 45 to the upper portion of the extension piece 40.

Hydraulic lines 46 and 47 extend to a source of hydraulic fluid supply customarily carried by harvesters of this type and to a control valve 48 (FIGURES 1, 2 and 3) which is accessible to the driver occupying the seat 17.

In the use of the device the harvester with both front wheels 13 and 14 in contact with the ground and supporting the front portion of the harvester will move to and from the cane field and up and down the rows of the growing cane. At the end of each row the harvester will move on to the headland and is required to make a turn to re-enter the square and to move down a subsequent row for which purpose the machine must make a turn of substantially 180°.

Figure 8:
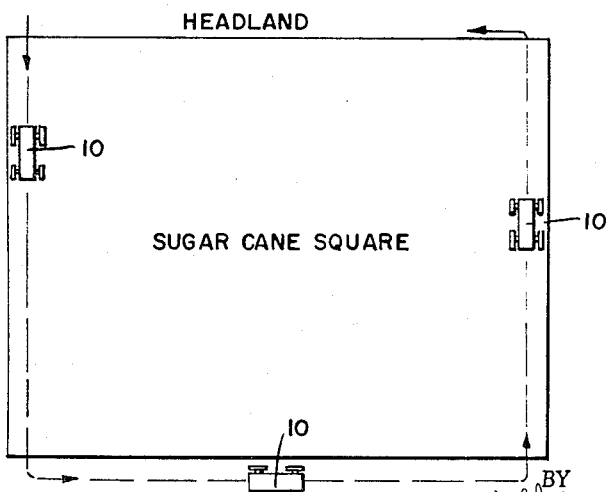
FIGURE 8 is a schematic of a sugar cane square showing the headlands and movements of a harvester in three positions.
Figure 6:
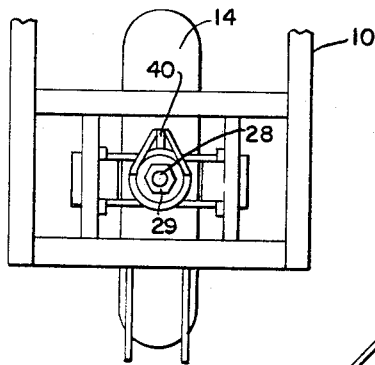
FIGURE 6 is a top plan view taken on the line 6—6 in FIGURE 4.
Figure 3:
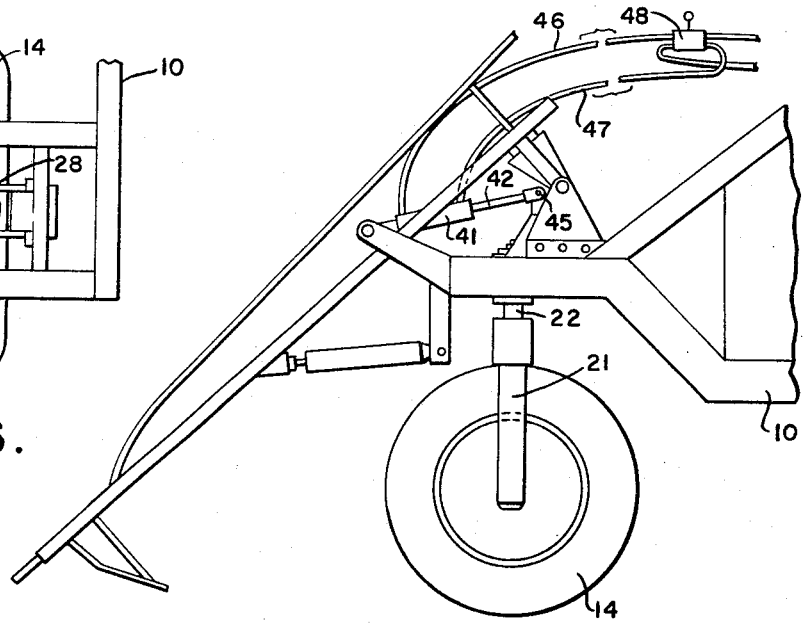
FIGURE 3 is a fragmentary side elevational view of the front portion of the harvester from the side of the left wheel showing one form of mechanism for achieving the raising and lowering of this wheel.

In reaching the headland as shown by the plat of FIGURE 8, the operator will actuate the valve 48 to shift the parts to the position of FIGURE 5 where the fourth wheel 14 is lifted out of contact with the ground and consequently the weight of steering effort will devolve upon the companion wheel 13 which may be maneuvered by the operator through the hydraulic lines 16 to turn about a substantially vertical axis through a desired degree to return the harvester to the square and by disengaging the wheel 14 a much sharper turn may be made in less over-all space. As soon as the turn is completely executed the raised wheel 14 may be restored to its down or lowered position in contact with the ground whereupon it resumes its share of the load of the front portion of the harvester and the wheel 14 will remain in this down position throughout the straight movement of the harvester down a subsequent row until the harvester reaches the opposite headland when the wheel 14 is again elevated by simple action of the driver.

The invention has for its further object a novel method of harvesting sugar cane in such cane growing areas as southwest Louisiana, where the cane is planted in squares between drainage ditches with quarter drains running crosswise of the rows to the ditches, with the canes or cane stalks growing to great height on hills between furrows, which hills and furrows extend between opposite headlands, the method being carried out by use of the novel form of harvester as herein described wherein means is provided for permitting the raising and lowering of one front wheel from and to supporting contact with the ground, such method comprising driving the harvester so-equipped and initially with the said front wheel down in supporting contact with the ground across the near headland and into the square with the front and rear wheels tracking in the adjacent furrows to opposite sides of a hill, and the harvester straddling the included hill, until the harvester completes the run to the opposite headland where the said one front wheel is raised from contact supporting relation with the ground and to permit sharp turning in small linear length of the harvester on the permanently down front wheel to quickly orient the harvester to a right angle position relatively to the lengths of the rows, whereupon the previously raised front wheel is lowered to ground supporting contact and the harvester driven down the headland to the next row to be entered at which point the said front wheel is again raised, and the harvester steered in a sharp right angular turn into the said next row, the said raised front wheel again lowered and the harvester driven down such next row, the operation being repeated at the next headland and so throughout the entire square.

In practice, heretofore, the operation of cane harvesters has been to enter a square by entering the second row which is adjacent one of the ditch bank rows. The harvester is driven down this second row from the entering headland to the opposite headland, then the harvester is driven to row 19 which is adjacent the opposite ditch bank row and cuts the cane in this row 19 and in so doing comes out at the initial headland. The harvester is then driven across this initial headland to row 3, proceeds down row 3 in a cane cutting operation and regains the opposite headland where it again turns and goes all the way over to row 18, coming along row 18, out the initial headland and across such headland to row 4. This pattern has been followed for many years in the cane growing district of Louisiana and it probably arose initially because the large harvesters could not be turned shortly and sharply but they were required to make long loops extending quite a distance back into the headlands away from the square to negotiate the turns required. This practice has involved a great deal of unnecessary mileage with great needless consumption of fuel and has been found to be time consuming with respect to the operator's time and expense. It has also involved delay in finalizing cutting and removal of the cane to the mill. Cane farmers must await the ripening of the cane before beginning a harvesting in what is called the grinding season which occurs in the fall. As soon as the cane ripens, there begins an incessant activity of harvesting to beat the deadline of the first killing frost.

The turning of harvesters is, therefore, of great importance in the Louisiana and other cane field areas. Such short turning reduces significantly harvester mileage and time of cutting and harvesting sugar cane. It reduces fuel costs and supplies the cane in better prime condition to the mill. It is preferred that the turns be made with the front wheel 13 on the outside or "offside" of the turn and with the wheel 14 raised and inoperative on the inside of the turn. While this sequence is believed to give better results, operators may use the reverse pattern.

Although I have disclosed herein the best form of the invention known to me at this time, I reserve the right to all such modifications and changes as may come within the scope of the following claims.

What is claimed is:

1. In the art of harvesting sugar cane, in which the cane grows to a great height in squares on hills between adjacent furrows where the furrows and hills terminate in opposite headlands, a cane harvesting machine comprising
   (a) a high heavy frame,
   (b) cane harvesting equipment installed on the frame,
   (c) rear driving wheels movably supporting the frame at the rear portion thereof spaced apart to travel in adjacent furrows and straddle the included hills,
   (d) laterally spaced front wheels,
   (e) a steerable but otherwise fixed wheel mount on the frame for one of the front wheels positioning such front wheel to track at all times in the same furrow as one of the rear wheels and to contribute with both rear wheels to at substantially all times support the frame at a predetermined fixed distance from the ground, (f) a retractable wheel mount on the frame for the other front wheel positioning such other front wheel to track in the same furrow as the other rear wheel when the said other front wheel is in lowered position contributing with the other three wheels to the support of the frame, and (g) means for selectively retracting said retractable wheel mount and its front wheel to withdraw its front wheel from supporting engagement with the ground and impose all steering and front support on said one front wheel for ease and short turning of the harvester into and out of the headlands.

2. A cane harvesting machine as claimed in claim 1 further comprising (h) means for steering said retractable wheel mount and said other front wheel when the latter is engaged with the ground to avoid drag and contribute to the steering effort.

3. For use with a harvester having at least two laterally spaced rear wheels and two similarly laterally spaced front wheels with one of the front wheels being retractable out of contact with the ground and the other front wheel steerable, the method of harvesting sugar cane growing in rows in a square between two headlands comprising (a) driving the harvester from a headland straight into a row of standing cane with the retractable wheel down in contact with the ground and in load and stability participation with the other three wheels, (b) on gaining the opposite headland, retracting the retractible front wheel off the ground while leaving the other three wheels in ground contact and total load support, (c) turning the single steerable front wheel in a steering operation to effect a sharp turn of the harvester into a path adjacent alongside the square of standing cane, (d) on completion of the turn, lowering the steerable retractable wheel onto the ground, (e) proceeding along such path on all four wheels until the next row in selection is reached, (f) again retracting the retractible front wheel off the ground, (g) again turning the steerable front wheel in a steering operation to effect a sharp turn into said next row, (h) and proceeding in like manner from headlands to rows until the entire square is harvested.

4. The method of harvesting sugar cane as claimed in claim 3 in which at each turning steering operation the turn is made in the direction of the retracted wheel with the other front wheel at the outside of the turn.

References Cited

UNITED STATES PATENTS 3,091,476   5/1963   Blake.

BENJAMIN HERSH, *Primary Examiner.*

R. R. SONG, *Assistant Examiner.*